(12) United States Patent
Bowman et al.

(10) Patent No.: US 6,519,538 B1
(45) Date of Patent: Feb. 11, 2003

(54) METHOD FOR PREDICTING STABILITY CHARACTERISTICS OF POWER SUPPLIES

(76) Inventors: Wayne C Bowman, 5 Oxford Pl., Allen, TX (US) 75002; Chris Morrow Young, 945 W. Yellow Jacket, Rockwall, TX (US) 75087

( * ) Notice: Subject to any disclaimer, the term of this patent is extended or adjusted under 35 U.S.C. 154(b) by 0 days.

(21) Appl. No.: 09/544,827

(22) Filed: Apr. 6, 2000

(51) Int. Cl.[7] .............................................. G06F 19/00
(52) U.S. Cl. ............................ 702/65; 702/65; 702/57; 702/70; 324/176; 324/430; 324/525; 363/74
(58) Field of Search ...................... 702/57, 60; 363/59; 324/525; 700/286

(56) References Cited

U.S. PATENT DOCUMENTS

| 5,818,245 A | * | 10/1998 | Allfather | .................... | 324/707 |
| 6,054,867 A | * | 4/2000 | Wakamatsu | ................. | 324/650 |

OTHER PUBLICATIONS

H.W. Bode, "Relations Between Attenuation and Phase in Feedback Amplifier Design"; Bell System Technical Journal, Jul. 1940.

V. Joseph Thottuvelil and George C. Verghese, "Analysis and Control Design of Parallelled DC/DC Converters With Current Sharing"; IEEE Transactions on Power Electronics; Jul., 1998.

H. Nyquist, "Regeneration Theory"; Bell System Technical Journal; Jan. 1932.

* cited by examiner

*Primary Examiner*—Marc S. Hoff
*Assistant Examiner*—Elias Desta

(74) *Attorney, Agent, or Firm*—Law Office of Donald D. Mondul

(57) ABSTRACT

A method for determining the effect of load impedance on the magnitude and phase of loop gain of a power converter apparatus to aid in predicting stability of the converter apparatus under various operating conditions. The converter apparatus has an open-loop output impedance and provides an output signal to an output locus. The method comprises the steps of: (a) vectorally measuring a first loop gain of the converter apparatus with a first load impedance connected with the output locus, to record phase and gain of the first loop gain for a plurality of frequencies; (b) vectorally measuring open loop output impedance as a function of frequency of the converter apparatus, to record phase and gain of the open loop output impedance for a plurality of frequencies; (c) vectorally measuring the first load impedance as a function of frequency of the converter apparatus, to record phase and gain of the first load impedance for a plurality of frequencies; (d) calculating a first load distribution factor using the first load impedance and the open-loop output impedance; the calculating being effected in vectoral manner to record magnitude and phase of the first load distribution factor for a plurality of frequencies; (e) selecting a second impedance load with an output voltage sense point, the second impedance load being representable by a network of at least one resistor and at least one capacitor or inductor, the output voltage sense point being situated at a selected node of the network; (f) calculating a second load distribution factor for the second impedance load using the open-loop output impedance and the second impedance load; the calculating being effected in vectoral manner to record magnitude and phase of the impedance-loop load distribution factor for a plurality of frequency values; and (g) calculating a second loop gain using the first loop gain, the first loop load distribution factor and the second loop load distribution factor; the calculating being effected in vectoral manner to record magnitude and phase of the impedance-load gain for a plurality of frequency values.

23 Claims, 7 Drawing Sheets

METHOD FOR PREDICTING STABILITY CHARACTERISTICS OF POWER SUPPLIES

BACKGROUND OF THE INVENTION

The present invention is directed to a method for predicting stability characteristics of single and multiple paralleled power supplies under arbitrary load conditions. The present invention is particularly directed to a method for predicting stability characteristics for direct current, DC-to-DC, power supplies.

Thottuvelil and Verghese characterized a power converter as a Thevenin voltage source model in their paper setting forth a small-signal stability analysis of paralleled DC-DC converter systems. (See, V. Joseph Thottuvelil and George C. Verghese; "Analysis and Control Design of Paralleled DC/DC Converters with Current Sharing"; IEEE Transactions on Power Electronics, Vol. 13, No. 4; July 1998.) The inventor of the present invention has employed a similar model, but for a different purpose: to analyze DC-DC power converter apparatus for improving predictions regarding stability of individual power converter apparatuses.

When designing power supply, or power converter circuits, one must take into account the potential user's load characteristics. This consideration is especially important in the design of DC-DC converters because such converters are generally configured as a closed loop system that monitors its output, provides feedback indicating its output, and employs the feedback to adjust to maintain a constant DC output. In any feedback system, it is of significant importance that the feedback loop be stable. A simple example of an unstable feedback loop is the loud tone produced in the presence of audio feedback when a microphone is placed too close to a speaker producing signals originating at the microphone.

Today's electronic devices are more and more designed to be , smaller, and more reliable. This trend for product requirements is especially evident in portable electronic devices such as cellular telephones, electronic games, and portable computers. Some practical design consequences of this trend are that output voltages for DC-DC converters are getting lower and the stability of output of DC-DC converters is more critical. Nyquist developed criteria to assess the stability of a control loop ("Regeneration Theory", H. Nyquist, Bell System Technical Journal, January 1932). Bode ("Relations Between Attenuation and Phase in Feedback Amplifier Design", Bell System Technical Journal, July 1940) expressed these criteria in terms of the phase ($\phi$) and gain of a transfer function According to this analysis, if gain (dB) and phase change ($\Delta\phi$) of the loop gain are zero at the same frequency in a circuit, the circuit will be unstable.

As a practical engineering measure, one must design a circuit having $\geq 45°$ phase margin to reliably have a stable circuit. Phase margin is the value of phase when gain as a function of frequency crosses through zero from positive to negative. Thus, when gain is 0 dB, and gain is passing from positive to negative, phase must be $\geq 45°$ in order for the circuit under consideration to be stable with adequate margin.

Another measure of stability is to require that gain margin be $\geq -7$ to $-10$ dB. That is, when phase as a function of frequency crosses through zero, gain must be at least 7–10 dB in order that the circuit under consideration will be a stable circuit The fact that a user's load characteristics figure so intimately in stability of DC-DC converter circuits, and the ever more stringent requirements for greater stability at lower voltages for modem electronic circuits have made present ways of predicting stability of a particular DC-DC converter circuit for a particular application uneconomical and not particularly reliable or accurate.

Presently, manufactures of power supplies, and especially of DC-DC converters, use simulations, or laboratory measurements, or closed form analytical expressions, or all tree of those methods for determining whether a particular circuit is stable with a particular load. Simulations are expensive in that they occupy large amounts of computer capacity and time. Closed form analytical expressions rely on simplifying assumptions that introduce significant errors. Laboratory measurements are an expensive approach to answering questions about a particular circuit-load stability in terms of human time and computer assets involved. Further, neither simulations, closed form analytical expressions nor laboratory experimentation are particularly accurate in predicting ability of converter apparatuses under various load conditions.

One result of ongoing efforts to predict stability with arbitrary loads is that man of power converters must essentially custom-tailor their products to user's loads on a case-by-case basis. Such a "job shop" approach to production precludes one's taking advantage of the economies of scale which could be enjoyed if a manufacturer could predict which loads were amenable to stable use with particular converters. That is, if manufacturers could predict stability for a particular converter circuit within established limits for a definable range of load characteristics, then families of converter products could be manufactured and the inefficiencies of customizing converter circuits for each discrete load criterion may be avoided There is a need for a method for predicting stability characteristics of power converters under arbitrary load conditions. This need is particularly acute in predicting stability characteristics of DC-DC power converter circuits.

SUMMARY OF THE INVENTION

The preferred embodiment of the present invention is a method for determining the effect of load impedance on the magnitude and phase of loop gain of a power converter apparatus to aid in predicting stability of the converter apparatus under various operating conditions. The converter apparatus has an open-loop output impedance and provides an output signal to an output locus. The method comprises the steps of: (a) vectorally measuring a first loop gain of the converter apparatus with a first load impedance connected with the output locus, to record phase and gain of the first loop gain for a plurality of frequencies; (b) vectorally measuring open loop output impedance as a function of frequency of the converter apparatus, to record phase and gain of the open loop output impedance for a plurality of frequencies; (c) vectorally measuring the first load impedance as a function of frequency of the converter apparatus, to record phase and gain of the first load impedance for a plurality of frequencies; (d) calculating a first load distribution factor using the first load impedance and the open-loop output impedance; the calculating being effected in vectoral manner to record magnitude and phase of the first load distribution factor for a plurality of frequencies; (e) selecting a second impedance load with an output voltage sense point, the second impedance load being representable by a network of at least one resistor and at least one capacitor or inductor, the output voltage sense point being situated at a selected node of the network; (f) calculating a second load distribution factor for the second impedance load using the open-loop output impedance and the second impedance load; the calculating being effected in vectoral manner to record magnitude and phase of the impedance-loop load distribution factor for a plurality of frequency values; and (g) calculating a second loop gain using the first loop gain, the fist loop load distribution factor and the second loop load distribution factor; the calculating being effected in vectoral manner to record magnitude and phase of the impedance-load gain for a plurality of frequency values.

One example of the application of the method of the present invention is generation of a Stable Operating Area Plot. By employing the method of the present invention one can plot contours of constant phase margin as a function of the resistive and reactive portions of the arbitrary second load network. Such a plot facilitates identifying stable operating ranges for selected load impedances. Information regarding stable operating parameters provides a product designer with a valuable tool for assessing stability of a particular converter apparatus under a variety of loading conditions. The reference tool may be in the form of a multidimensional graphic relation of gain, phase and frequency data. Alternate ways to create such a reference tool include a multidimensional vectoral table. Such a vectoral table may be maintained on-line for access by software inquiry, or it may be produced in printed or other form.

It is, therefore, an object of the present invention to provide a method for determining relationships among magnitude and phase of loop gain, open loop output impedance and load impedance for a power converter apparatus to aid in predicting stability of said converter apparats under various operating conditions.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
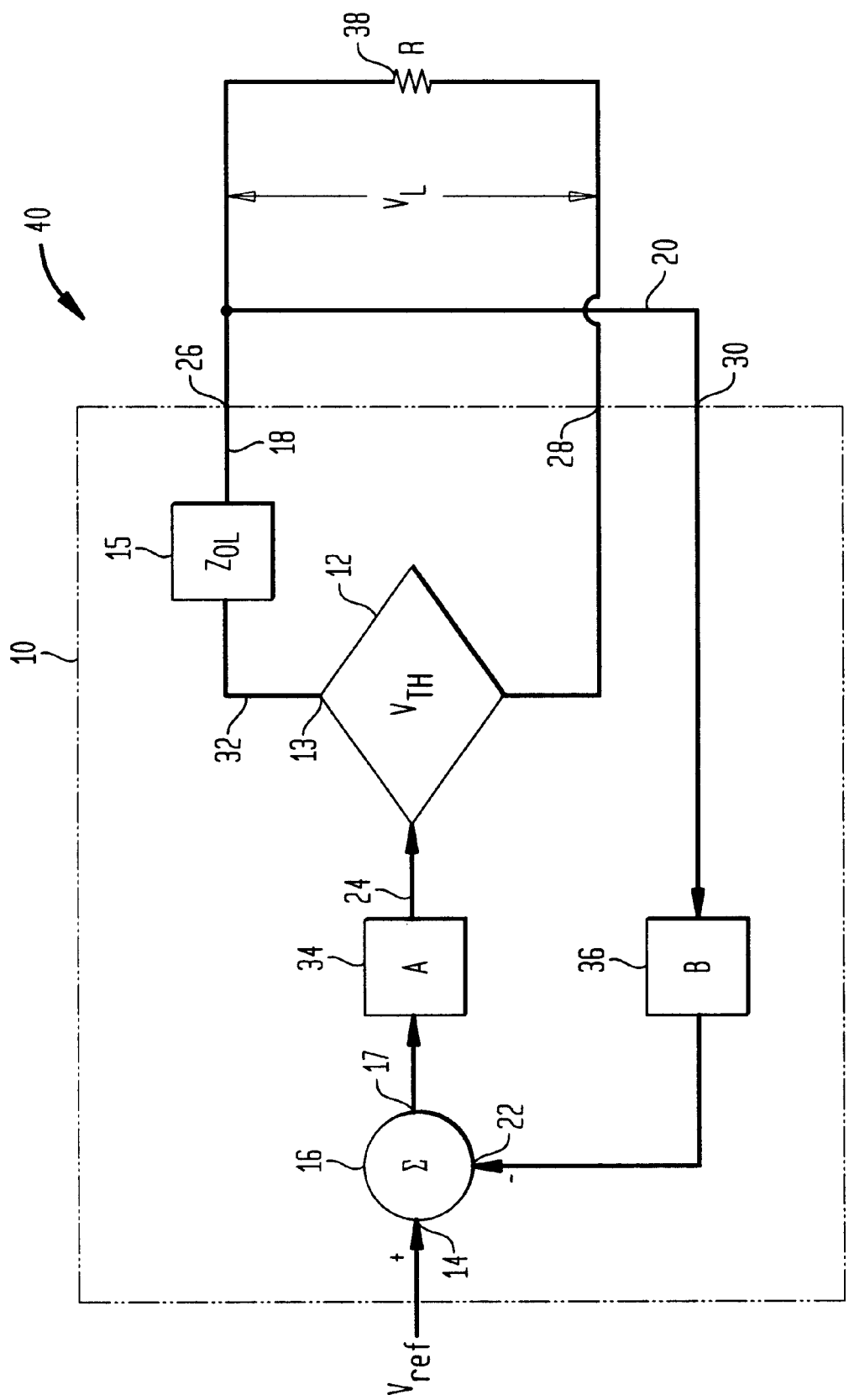
FIG. 1 is an electrical schematic diagram of a power converter apparatus connected with a resistive load.

FIG. 1 is an electrical schematic diagram of a power converter apparatus connected with a resistive load. In principle, this load could as well be a complex load. A resistive load is used to illustrate the method of the present invention in connection with FIG. 1 to simplify the explanation. In FIG. 1, a power converter apparatus 10 includes a Thevenin voltage source 12 providing a voltage $V_{TH}$ and connected in series with an open-loop output impedance 15. Open-loop output impedance 15 has a value of $Z_{OL}$. Converter apparatus 10 has two output loci, or terminals 26, 28 and a sense locus, or terminal 30. Output terminals 26, 28 are connected with an output circuit 40. Output circuit 40 includes a resistive load 38 connected across output a terminals 26, 28. Resistive load 38 has a value $R_L$.

A reference voltage $V_{REF}$ is applied to a positive input node 14 of a difference generator 16. Difference generator 16 also receives, at a negative input node 22, a feedback signal multiplied by a gain stage 36 having a gain B, via a sense line 20 from output side 18 of open-loop output impedance 15, via output terminal 26 and via sense terminal 30. The difference between reference voltage $V_{REF}$ at positive input node 14 and the feedback signal at negative input node 22 is provided as a control signal by difference generator 16 from an output node 17 via a line 24 subject to a gain A, represented by a box 34, to control Thevenin voltage source 12. The control signal provided from output node 17 of difference generator 16 keeps Thevenin voltage source 12 generating a signal having a voltage value $V_{TH}$. Thevenin voltage source 12 provides voltage $V_{TH}$ to open-loop impedance 15 from an output node 13 via a line 32. Gain A, represented schematically at box 34, is the gain from output node 17 of difference generator 16 to output node 13 of Thevenin voltage source 12. Gain A does not include the effect of open-loop output impedance 15, or any external load impedances. Gain B, represented schematically at box 36, is the gain from sensed voltage at output terminal 26 to negative input node 22 of difference generator 16.

Referring to FIG. 1, if one regards the network including open-loop output impedance 15 and resistive load 38 as a voltage divider network, then it may be observed that voltage $V_L$ across resistive load 38 may be expressed as:

$$V_L = \frac{R_L}{Z_{OL} + R_L} \cdot V_{TH} \quad [1]$$

If we define the coefficient of $V_{TH}$ in expression [1] as a load distribution factor $\gamma_0$:

$$\gamma_0 = \frac{R_L}{Z_{OL} + R_L} \quad [2]$$

to Then, by substitution of expression [2] into expression [1]:

$$V_L = \gamma_0 \cdot V_{TH} \quad [3]$$

Inspection of FIG. 1 reveals that:

$$V_{TH} = A(V_{REF} - B \cdot V_L) \quad [4]$$

Substituting expression [4] into expression [3], and dividing by $\gamma_0$:

$$\frac{V_L}{\gamma_0} = A(V_{REF} - B \cdot V_L) \quad [5]$$

Rearranging $$V_L\left(\frac{1}{\gamma_0} + A \cdot B\right) = A \cdot V_{REF} \quad [6]$$

Further rearranging provides the transfer function $V_L/V_{REF}$. The stability of a converter, such as converter 10, working into a resistive load R, as illustrated in FIG. 1, is determined by examining the roots of the denominator of the reference voltage-to-output voltage transfer function:

$$\frac{V_L}{V_{REF}} = \frac{\gamma_0 \cdot A}{1 + \gamma_0 \cdot A \cdot B} \quad [7]$$

where:

$$\gamma_0 = \frac{R}{R + Z_{OL}} \quad [8]$$

The loop gain for a resistive load R is:

$$\text{gain}|R = \gamma_0 \cdot A \cdot B \quad [9]$$

The methodology of the present invention requires that loop gain of a converter apparatus (gain|$R_L$), open loop output impedance ($Z_{OL}$) and load impedance $R_L$ of a converter apparatus, such as converter apparatus 10 illustrated in FIG. 1, be measured using known methods of parametric measurement. Designation of load impedance by the symbol $R_L$ is intended to indicate that load impedance may be purely resistive (i.e., representable by a symbol R) or it may be complex (i.e., representable by a symbol $Z_L$). The objective of this methodology is to develop an analytical relationship between loop gain of the converter apparatus when loaded with an arbitrary load impedance and the measured loop gain (gain|$R_L$). This relationship involves the measured open loop output impedance $Z_{OL}$, the known resistive load $R_L$ and an arbitrary load impedance Z.

Referring to expressions [7] and [8] above, it is apparent that the reference voltage-to-output voltage transfer function (expression [7]) involves resistive load R This emphasizes that the load is intimately a part of the transfer function of a converter apparatus when it is employed in a circuit That is, one must take into account a customer's load when selecting a converter apparatus for a given customer application Prior attempts to predict stability of converter apparatuses propose analyzing a converter, with the customer load attached, using one of three techniques: (1) analytical, (2) simulation, or (3) experimental. Such a "custom-tailored" broach-evaluating a particular converter circuit for a particular customer load case—is not efficient, and effectively limits the converter manufacturer to custom products that are tailored for specific applications. Such a tailored design environment may produce products that are appropriate for their respective applications, but that lack the flexibilities and efficiencies in manufacturing present in a converter design that can be confidently applied to a myriad of applications. What is needed is a method for evaluating a given converter apparatus to predict its stability under a variety of loading characteristics. In such manner, one can manufacture a set of products (converters), each amenable to efficient use with a particular range of load values. With a proper method available for accurately ascertaining appropriate parameters to facilitate predicting each product's stability under a variety of load conditions, one may use the method to choose an appropriate existing product suitable for a particular load environment In such manner one can predict which converter of a set of existing converter products may apply to a given load circumstance, rather than having to analyze each converter product in terms of its amenability to stable employment with a particular customer's load.

Such evaluations of stability dilemmas are increasingly common in today's markets. One prevalent current employment of DC-DC converters is in the area of microprocessors. Microprocessors are recently requiring lower supply voltages and, as a consequence, tolerances for voltage variance are necessarily tighter in terns of magnitude of variance of voltage value. That is, for example, a 2% variance of 5 volts is a greater absolute voltage value than a 2% variance of 1 volt. An example of a common application of a customer load is a plurality of memory modules in a personal computer using a microprocessor, generally connected in parallel. Typical applications require a large amount of high Q capacitance in parallel with power input terminals of the memory modules to ensure that the voltage input bus does not vary outside of a predetermined range during a fast load transient. Thus, the nature of the load connected to the power module in such applications is typically highly complex, exhibiting both resistive and frequency dependent components. Prior approaches to predicting stability of a converter apparatus in serving such complex loads—(1) analysis, (2) simulation, or (3) experiment—have proven inaccurate and inadequate.

Two examples of an arbitrary load network will be described to illustrate the method of the present invention. A sense line 20 (FIG. 1) provides a feedback or sense signal from output terminal 26 of converter apparatus 10 to a sense terminal 30. Sense line 20 may be connected anywhere within output circuit 40. Two exemplary such connection arrangements will be discussed hereinafter in greater detail: "local sensing" and "remote sensing".

EXAMPLE 1

Figure 2:
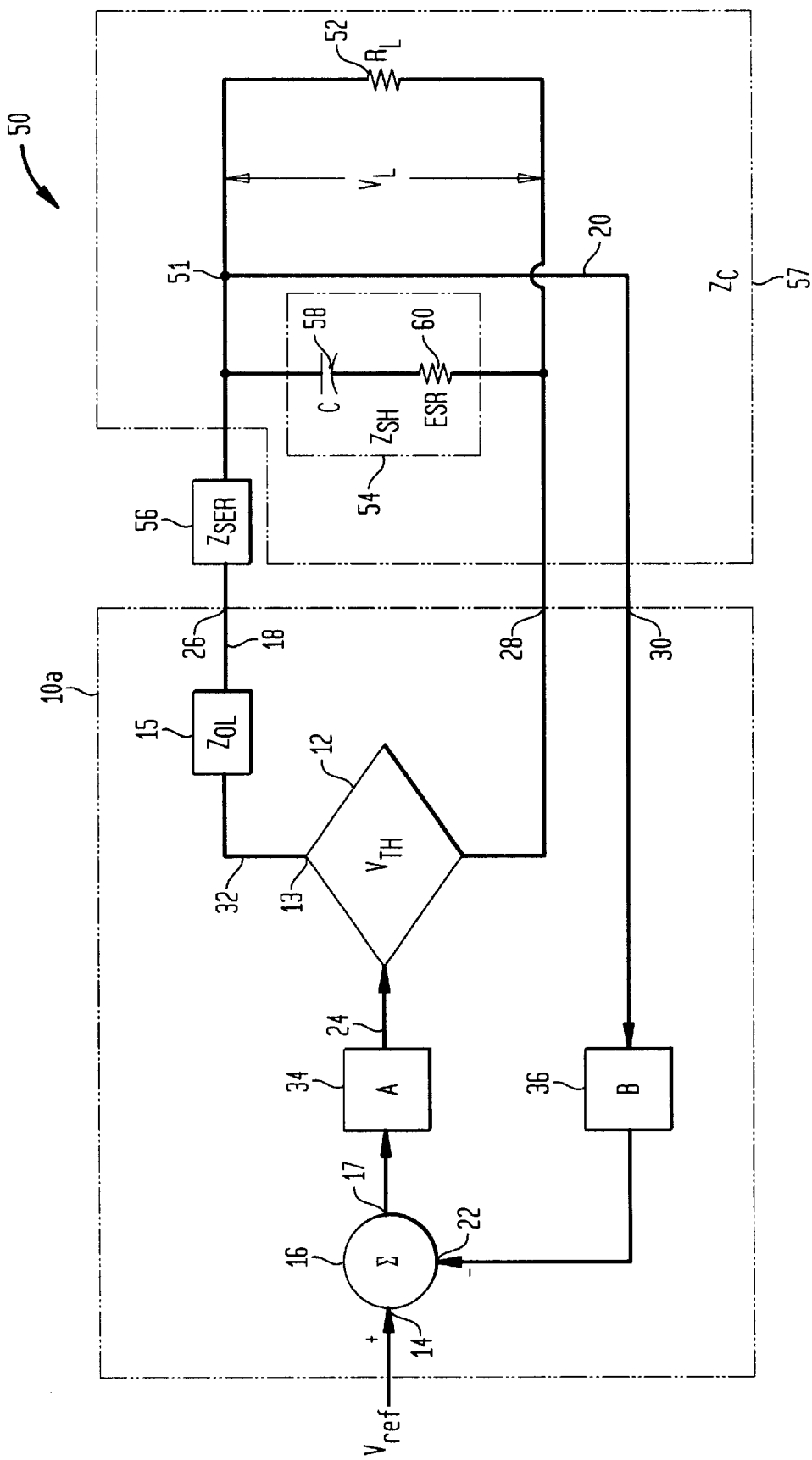
FIG. 2 is an electrical schematic diagram of a power converter apparatus connected with a complex load impedance and configured for remote sensing.

FIG. 2 is an electrical schematic diagram of a power converter apparatus connected with a complex load impedance and configured for remote sensing. In FIG. 2, a converter apparatus 10a is supplying an output circuit 50 connected across output terminals 26, 28. Converter apparatus 10a in FIG. 2 is represented by the same model as converter apparatus 10 in FIG. 1. In order to avoid prolixity, details of the construction of converter apparatus 10a will not be repeated here.

Output circuit 50 includes a series impedance 56 and a complex impedance 57. Series impedance 56 has a value of $Z_{SER}$; complex impedance 57 has a value of $Z_C$. Complex impedance 57 includes a resistive load 52 and a shunt impedance 54 connected in parallel. Series impedance 56 is connected in series with complex impedance 57. The entire network consisting of series impedance 56 and complex impedance 57 is connected across output terminals 26, 28 of converter apparatus 10. Shunt impedance 54 is represented as a capacitor 58, having a capacitance value of C, in series with an equivalent series resistance 60, having a resistance value of ESR.

Sense line 20 is connected for remote sensing of output signals from converter apparatus 10a at a sense point 51 substantially electrically adjacent complex load 57, comprised of shunt impedance 54 and resistive load 52. The location of sense line 20 at sense point 51 remote from output terminal 26 supports characterizing the sensing arrangement illustrated in FIG. 2 as "remote sensing". The transfer function from Thevenin voltage source 12 to sense point 51 can be expressed as:

$$\frac{V_L}{V_{TH}} = \gamma_1 = \frac{Z_C}{Z_{OL} + Z_C + Z_{SER}} \quad [10]$$

In the case of converter 10$a$ configured for remote sensing (FIG. 2):

$$Z_C = R_L \| Z_{SH} \quad [11]$$

That is, $Z_C$ is the parallel combination of $R_L$ and $Z_{SH}$. Substituting expression [11] into expression [10]:

$$\gamma_1 = \frac{R_L \| Z_{SH}}{R_L \| Z_{SH} + Z_{SER} + Z_{OL}} \quad [12]$$

for remote sense (FIG. 2).

In converter apparatus 10$a$, load impedance $Z_C$ may be expressed as:

$$R_L \| \left( ESR + \frac{1}{sC} \right) \quad [13]$$

That is, resistive load $R_L$ connected in parallel with the impedance $(ESR+1/sC)$, where, $s=j\omega$, and where $j$ is $\sqrt{-1}$ [14]

The reference voltage-to-output voltage transfer function for converter at 10$a$ (FIG. 2) can be derived in a manner similar to the derivation discussed earlier in connection with converter apparatus 10 (FIG. 1). In order to avoid prolixity, details of derivation will not be repeated here. The result is:

$$\frac{V_L}{V_{REF}} = \frac{\gamma_1 \cdot A}{1 + \gamma_1 \cdot A \cdot B} \quad [15]$$

The loop gain of converter apparatus 10$a$ (FIG. 2) is $\gamma_1 \cdot A \cdot B$. The relationship between measured loop gain (gain$|R_L$) and loop gain when converter 10$a$ is loaded with impedance $Z_{SER}+Z_C$ is given by:

$$\gamma_1 \cdot A \cdot B = \text{gain}|Z_C = (\gamma_0 A \cdot B) \cdot \frac{\gamma_1}{\gamma_0} = \text{gain}\left|R_L \cdot \frac{\gamma_1}{\gamma_0}\right. \quad [16]$$

EXAMPLE 2

Figure 3:
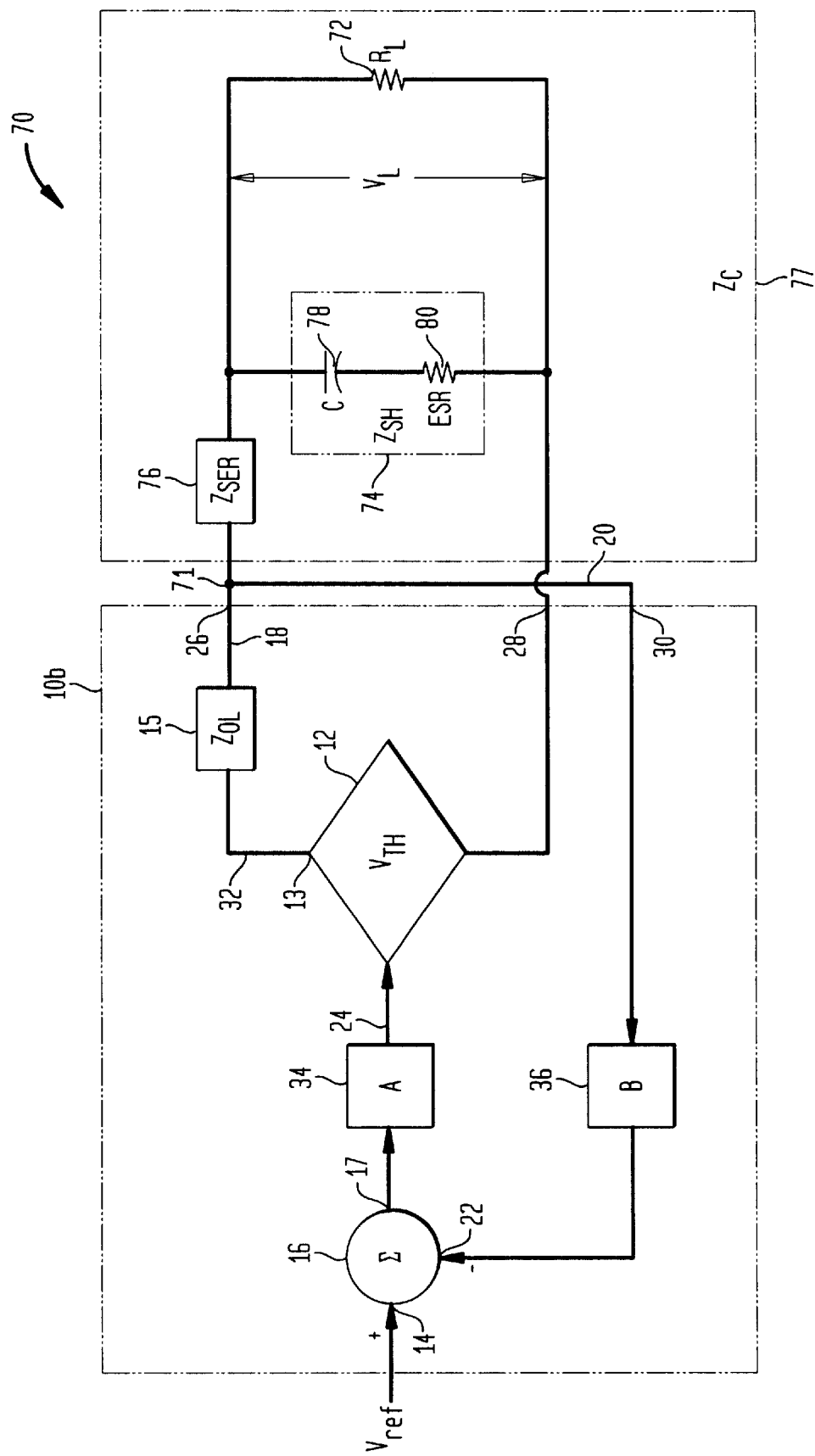
FIG. 3 is an electrical schematic diagram of a power converter apparatus connected with a complex load impedance and configured for local sensing.

FIG. 3 is an electrical schematic diagram of a power converter a connected with a complex load impedance and configured for local sensing. In FIG. 3, a converter apparatus 10$b$ is supplying an output circuit 70 connected across output terminals 26, 28. Converter apparatus 10$b$ in FIG. 3 is represented by the same model as converter apparatus 10 in FIG. 1. In order to avoid prolixity, details of the construction of converter apparatus 10$b$ will not be repeated here.

Output circuit 70 includes a series impedance 76, a complex shunt impedance 74 and a load resistor 72. Series impedance 76 has a value of $Z_{SER}$; complex shunt impedance 74 has a value of $Z_{SH}$. Complex impedance 77 has a value $Z_C$ and includes resistive load 72 and shunt impedance 74 connected in parallel, and this network connected in series with series impedance $Z_{SER}$. Resistive load 72 has a value of $R_L$. Output circuit 70 is connected across output terminals 26,28 of converter is 10$b$. Shunt impedance 74 has a value of $Z_{SH}$. Shunt impedance 74 is represented as a capacitor 78, having a capacitance value of C, in series with an equivalent series resistance 80, having a resistance value of ESR.

Sense line 20 is connected for local sensing of output from converter apparatus 10$b$ at a point 71 substantially adjacent output terminal 26. The close proximity of sense line 20 with output terminal 26 supports characterizing the sensing arrangements illustrated in FIG. 3 as "local sensing". The transfer function for converter 10$b$ from Thevenin voltage source 12 to output voltage across output circuit 70 ($V_L$) is given by:

$$\frac{V_L}{V_{REF}} = \gamma_2 = \frac{Z_C}{Z_{OL} + Z_C} \quad [17]$$

In converter apparatus 10$b$, illustrated in FIG. 3 connected for local sensing, the value of $Z_C$ is different than was the case with converter apparatus 10$a$ (FIG. 2). In the case of converter apparatus 10$b$:

$$Z_C = R_L \| Z_{SH} + Z_{SER} \quad [18]$$

That is, $Z_C$=impedance $R_L$ in parallel with the impede $Z_{SH}$, plus the impedance $Z_{SER}$.

thus:

$$\gamma_2 = \frac{R_L \| Z_{SH} + Z_{SER}}{R_L \| Z_{SH} + Z_{SER} + Z_{OL}} \quad [19]$$

for local sense (FIG. 3).

The reference voltage-to-output voltage transfer function for converter apparatus 10$b$ (FIG. 3) can be derived in a manner similar to the derivation discussed earlier in connection with converter apparatus 10 (FIG. 1). In order to avoid prolixity, details of derivation will not be repeated here. The result is:

$$\frac{V_L}{V_{REF}} = \frac{\gamma_2 \cdot A}{1 + \gamma_2 \cdot A \cdot B} \quad [20]$$

Recall the fundamental relationship expressed in expressions [12] and [19]:

$$\gamma_1 = \frac{R_L \| Z_{SH}}{R_L \| Z_{SH} + Z_{SER} + Z_{OL}} \quad \gamma_2 = \frac{R_L \| Z_{SH} + Z_{SER}}{R_L \| Z_{SH} + Z_{SER} + Z_{OL}} \quad [21]$$

Thus, it may be observed, $$\gamma_n = f(C, ESR, R_L, Z_{OL}) \quad [22]$$

That is, $\gamma$n is a function of capacitance and equivalent series resistance of a complex load.

Recall, from expression [9] that the loop gain for a purely resistive load $R_L$ is:

$$\text{gain}|R_L = \gamma_0 \cdot A \cdot B \quad [9]$$

The gain for a converter serving a given complex impedance $Z_C$ is:

$$gain\,|\,Z_C = gain\left|R_L \cdot \frac{\gamma_n}{\gamma_0}\right. \quad [23]$$

In any feedback system, including the converter apparatus 10, 10a and 10b illustrated in FIGS. 1–3, the feedback loop established by sense line 20 must be stable. An example of an unstable feedback loop is the unstable audio feedback loop established when a microphone is situated too close to a speaker which receives its input from that microphone. A loud audio tone is produced—unstable audio feedback.

Stability may be expressed in terms of phase ($\phi$) and gain of a transfer function. Nyquist's criteria for stability may be paraphrased: If gain is at 0 dB (crossing from positive to negative), and $\Delta\phi$ (i.e., phase difference) is 0 at the same time, then the system is unstable. A generally accepted engineering design rule is that there preferably should be a phase margin $\geq 45°$ (that is, the value of $\phi$ should be $\geq 45°$ when gain passes through 0 dB from positive to negative). An additional measure of acceptable engineering design stability margin is gain margin, the value of the gain when phase ($\phi$) passes through 0 degrees. A preferred acceptable gain margin is –7 dB to –10 dB.

The loop gain of a converter apparatus loaded with any arbitrary external impedance, such as complex impedance $Z_C$, as measured at an arbitrary output voltage sense point, can be calculated using the basic model of a converter with a purely resistive load $R_L$, illustrated as converter apparatus 10 (FIG. 1). The calculation requires measuring the loop gain ($\gamma AB$) and the open loop output impedance ($Z_{OL}$) working into a defined resistance $R_L$. The loop gain when the module is loaded with arbitrary external impedance $Z_C$ is then given by:

$$\gamma_n \cdot A \cdot B = gain\,|\,Z_C = (\gamma_0 \cdot A \cdot B) \cdot \frac{\gamma_n}{\gamma_0} = gain\left|R_L \cdot \frac{\gamma_n}{\gamma_0}\right. \quad [24]$$

where:
  gain$|Z_C$ is the loop gain with the converter loaded with an arbitrary customer impedance $Z_C$.
  gain$|R_L$ is the loop gain with the converter loaded with a known load resistance $R_L$.
  $\gamma_0$ is the $V_{TH}$- to $-V_L$ load distribution factor with converter apparatus 10 working into only the load impedance $R_L$. The equation for $\gamma_0$ is given at expression [2].
  $\gamma_n$ is the $V_{TH}$- to $-V_L$ load distribution factor with converter apparatus 10a or 10b working into an arbitrary load $Z_C$. Two examples of $\gamma_n$ are given in expressions [12] and [17]. Observe that $\gamma_n$ is a simple ratio of impedances and can easily be determined for any external load impedance and associated output voltage sense point.

Remote sensing (FIG. 2, converter apparatus 10a) and local sensing (FIG. 3, converter apparatus 10b) are merely two typical examples of sensing-feedback arrangements useful for employing the method of the present invention. There are other sensing-feedback arrangements which may work equally well, and those other arrangements are considered within the scope of the present invention. To use another sensing-feedback arrangement than presented as an example in this application merely requires redefining such terms as $Z_C$ and $\gamma_n$, used in the expressions discussed above.

Expression [25] may be used to calculate the loop gain and phase characteristics of a converter apparatus loaded with an arbitrary load impedance $Z_C$ if the following factors are known as a function of frequency:

Open loop output impedance ($Z_{OL}$)
Loop gain and phase working into a resistive load $R_L$ ($\gamma AB$)
The value of the resistive load ($R_L$)
The external impedance network loading the converter ($Z_C$)

For example, by plotting phase ($\phi$) values on a chart with axes representing capacitance C and equivalent series resistance ESR, for each converter product offered, a customer may consult the chart with his particular C/ESR characteristics for the load for which a converter is sought to power. The customer may then use the C/ESR plot to select a product which gives an appropriate margin of acceptable stability Thus, the characteristics of a given converter product may be predicted for a range of customer load conditions. Using such a prediction tool, a customer may choose a particular converter from among an array of converter products which meets the requirements of the customer in terms of handling the customer's impedance and providing sufficient stability for the application. Using such a prediction tool is much more efficient than analyzing each product for each customer impedance/stability combination—the present "job shop" approach taken in the industry.

The old ways—(1) analytical, (2) simulation, and (3) experimental—have serious shortcomings:

(1) Analytical: Uses linear mathematical modeling to approximate non-linear operations, and thereby suffers from inaccuracies inherent in the analytical process. These inaccuracies become increasingly important as the complexity of the circuit topologies increases and as the switching frequencies increase.

(2) Simulation: Uses much computer capacity, require substantial time and resources, and suffers from inherent inaccuracies similar to analytical approaches.

(3) Experiment: Also very time consuming, inaccurate, and personnel/computer intensive; therefore expensive.

The calculations necessary to carry out the preferred method of the present invention, as illustrated in connection with the various expressions discussed above, are not as computationally intensive as are the calculations required for analysis, simulation or experimentation. Thus, less computer resources are tied up in practicing the present invention than are employed in prior art approaches. Further, the calculations involved in the method of the present invention only need to be carried out one time for each converter product, when constructing the graph (or other prediction tool) required to determine the C/ESR- to -$\phi$ relationships. Other manifestations, or tools, may be created by the information gleaned from the above-described method for determining gain and phase information An alternate prediction tool may, for example, be expressed in terms of a vectoral value table, or it may be expressed as an on-line computer table accessible by specified selection or other software-implemented criteria not discussed in detail here. The point is that the method of the preset invention easily and straightforwardly ascertains relationships among parameters which are directly applicable to predicting stability of converter apparatuses over a range of possible customer loading requirements. The determinations of parameters necessary to evaluate stability are simple vectoral calculations, not calculation intensive and, therefore, do not use excessive computer or human resources.

Figure 4:
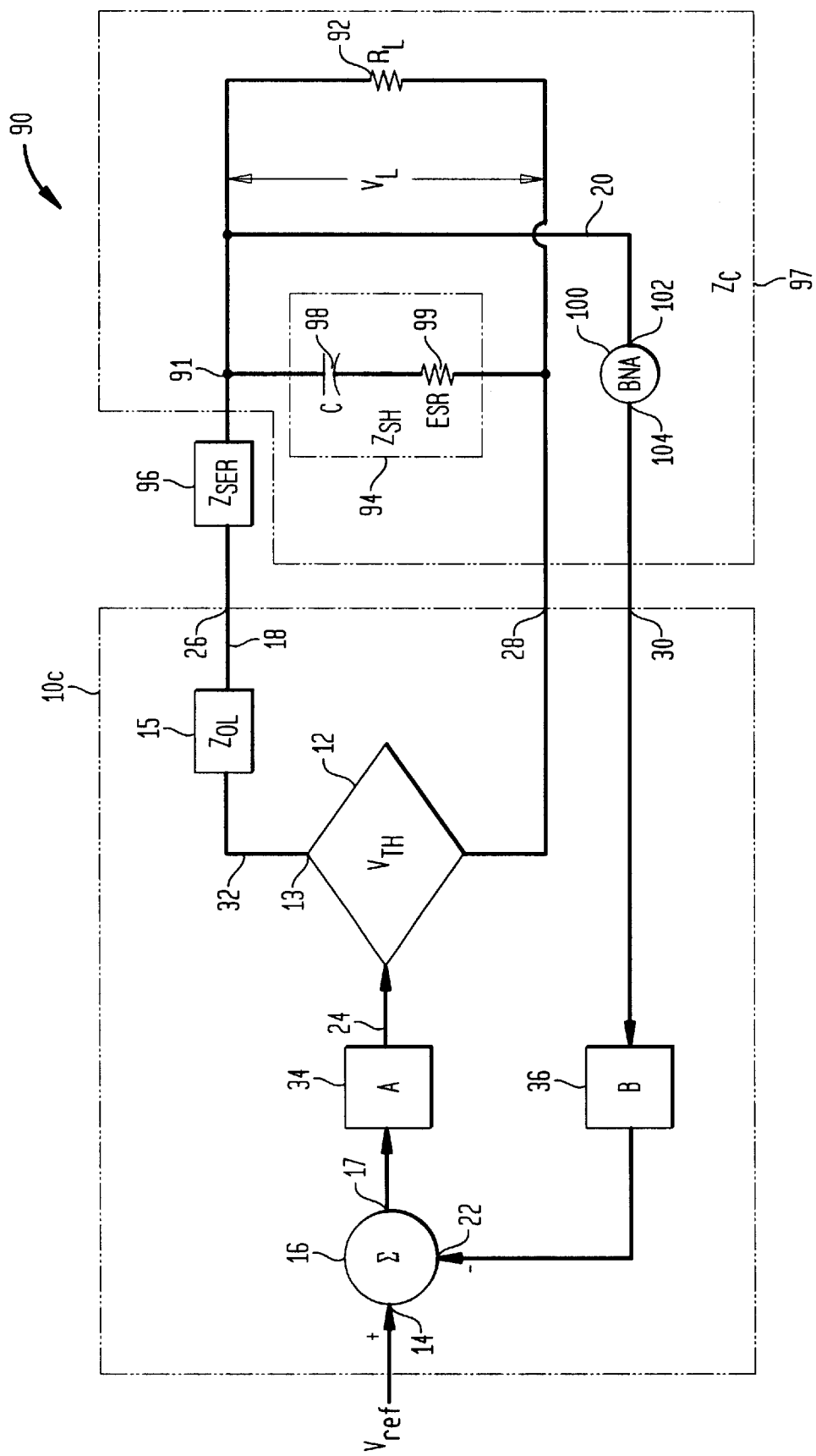
FIG. 4 is an electrical schematic diagram of a power converter apparatus with a complex load impedance, configured for remote sensing and connected with a Bode Network Analyzer for making vectoral measurements according to the preferred embodiment of the present invention.

FIG. 4 is an electrical schematic diagram of a power converter apparatus with a complex load impedance, configured for remote sensing and connected with a Bode Network Analyzer for making vector measurements according to the preferred embodiment of the present invention. In FIG. 4, a converter apparatus 10c is supplying an output circuit 90 connected across output terminals 26, 28. Converter apparatus 10c in FIG. 4 is represented by the same model as converter apparatus 10a in FIG. 2. In order to avoid prolixity, details of the construction of converter apparatus 10c will not be repeated here.

Output circuit 90 includes a series impedance 96 and a complex impedance 97. Series impedance 96 has a value of $Z_{SER}$; complex impedance 77 has a value of $Z_C$. Complex impedance 97 includes a resistive load 92 and a shunt impedance 94 connected in parallel with resistive load 92 across output terminals 26, 28. Series impedance 96 is connected in series with shunt impedance 94 and resistive load 92. Resistive load 92 has a value of R. Shunt impedance 94 has a value of $Z_{SH}$. Shunt impedance 94 is represented as a capacitor 98, having a capacitance value of C, in series with an equivalent series resistance 99, having a resistance value of ESR.

Sense line 20 is connected for remote sensing of output signals from converter apparatus 10c at a point 91 slibstially electrically adjacent complex load 97, comprised of shunt impedance 94 and resistive load 92. The location of sense line 20 at point 91 remote from output terminal 26 supports charaing the sensing arrangement illustrated in FIG. 4 as "remote sensing".

Output circuit 90 to converter apparatus 10c (FIG. 4) illustrates a preferred practical aspect of practicing the method of the present invention. Other measurement techniques may be used to practice the method of the present invention without straying from the intended scope of the invention.

In FIG. 4, output circuit 90 includes a Bode Network Analyzer (hereinafter referred to as a "BNA") 100 in sense line 20. A Bode Network Analyzer, such as BNA 100 in FIG. 4, applies a test signal (preferably a sinusoidal signal) to a circuit being tested and sweeps the frequency of that test signal across a range of frequencies in discrete steps. A BNA typically also has two BNA terminals for measuring responsive signals to the test signal introduced into the circuit under test BNA 100 in output circuit 90 includes a first BNA terminal 102 and a second BNA terminal 104. Each BNA terminal 102, 104 includes a meter for determining magnitude of a sensed responsive signal. Each BNA terminal 102, 104 also includes circuitry for determining the phase of a sensed responsive signal as it compares with the phase of the test signal applied to the circuit being tested. A BNA, therefore, can, for example, generate a sweep of data about a circuit being tested, in three columns: frequency, magnitude and phase (for parameters sensed by each of the two input terminals).

The method of the present invention is preferably practiced using a circuit configuration similar to the circuit configuration illustrated in FIG. 4. By using such a circuit configuration, the response of the circuit being tested (e.g., converter apparatus 10c) may be observed, measured and calculated in vectoral fashion. That is, for example, the values of gain and phase may be determined for a range of frequencies in discrete steps. Such a determination of vectorally expressed values facilitates evaluation of the circuit being ted according to Nyquist's criteria for stability, discussed earlier in this application. Simple vector multiplication, such as is used in executing the preferred embodiment of the method of the present invention, is less complicated and less computing asset hungry than a simulation program, such as would be used with a prior art approach, for example. Moreover, such direct stimulation of a test circuit and observation, measurement and calculation of parameters is more accurate than analytical or experimental (tuned for specific load criteria) methods used in the prior art.

Figure 5:
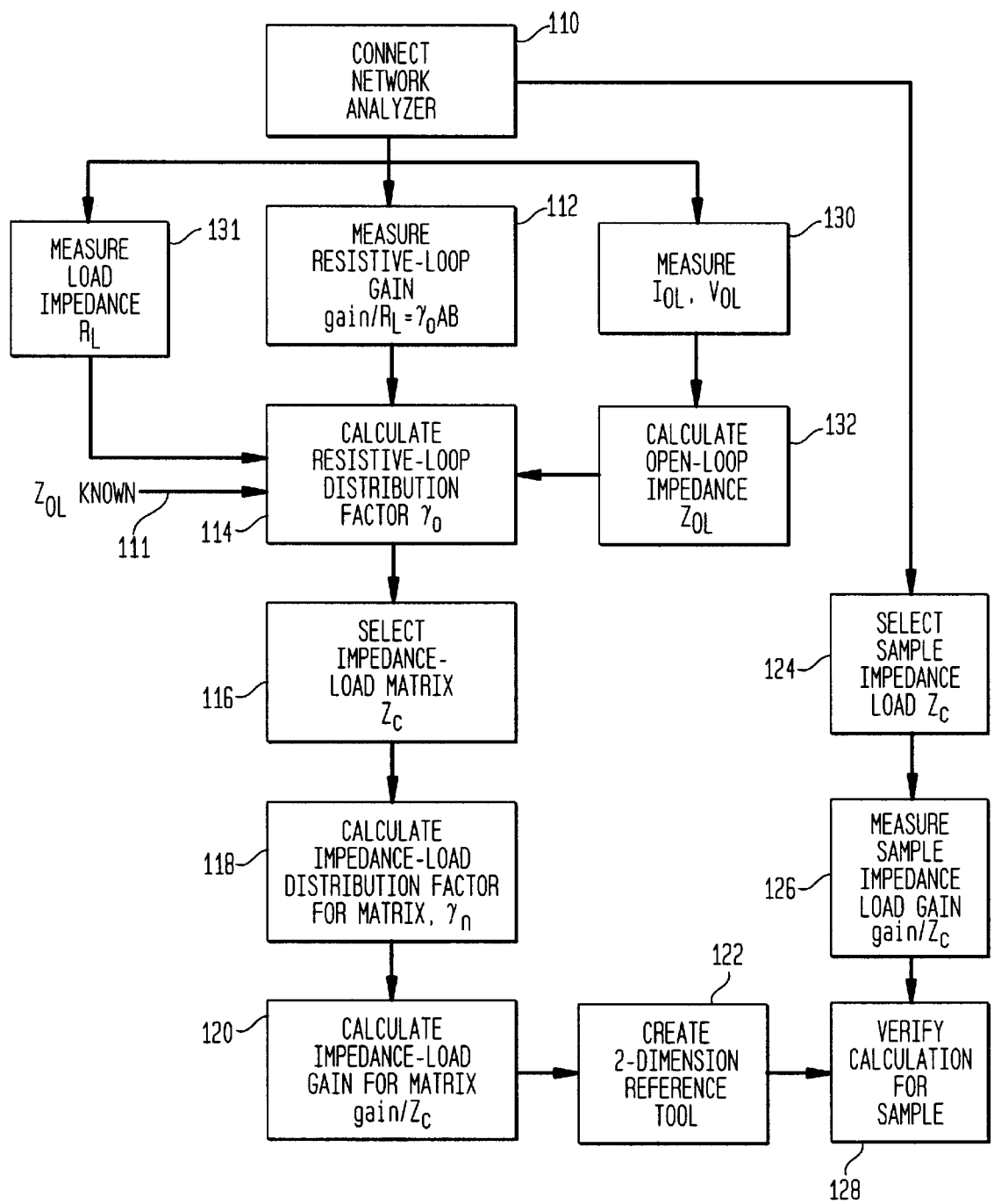
FIG. 5 is a flow chart illustrating a plurality of embodiments of the method of the present invention.

FIG. 5 is a flow chart illustration a plurality of embodiments of the method of the present invention. The method of the present invention begins with connecting a network analyzer ads with the converter apparatus to be evaluated, as indicated at a block 110. As discussed earlier, a network analyzer, such as a Bode Network Analyzer (BNA) applies a test signal (preferably a sinusoidal signal) to a circuit being tested and sweeps the frequency of that test signal across a range of frequencies in discrete steps. A BNA measures responsive signals to the test signal introduced into the circuit under evaluation. In pricing the method of the present invention as illustrated in FIG. 5, the value of open-loop impedance $Z_{OL}$ of the converter apparatus being evaluated is known, as indicated by an input 111 to a block 114.

A known impedance $R_L$ is included in the output circuit 40 (FIG. 1). By using a BNA, vectoral measurements of resistive-loop gain (gain|$R_L$) may be measured as a vector relating gain, frequency, and phase. Such measurement, indicated by a block 112, gives a value to resistive-loop gain for use in expression [9]:

$$\text{gain}|R_L = \gamma_0 \cdot A \cdot B \quad [9]$$

Block 114 indicates the next step in the method: calculating a resistive-loop distribution factor $\gamma_0$, according to expression [8]:

$$\gamma_0 = \frac{R_L}{R_L + Z_{OL}} \quad [8]$$

Next, as indicated by a block 116, a complex impedance-load $Z_C$ matrix is selected. In particular, according to the preferred embodiment of the method of the present invention, block 116 represents selection of a range of values for impedance-load $Z_C$. A preferred selection method is to select a range of capacitance (C) to be regarded as connected in series with a range of equivalent series resistances (ESR), and the series combination of C-ESR connected in parallel with resistive load impedance $R_L$. The network including C, ESR and $R_L$ comprises $Z_C$. Using the selected matrix of impedance-loads $Z_C$ and open-loop impedance $Z_{OL}$, an impedance-load distribution factor $\gamma_n$ is calculated for the matrix of values of impedance load $Z_C$, as indicated by a block 118. This calculation is carried out in vectoral fashion for each of the selected values of capacitance (C) and equivalent series resistance (ESR) to determine magnitude and phase of the impedance-load distribution factor $\gamma_n$ for a plurality of frequency values, according to expression [10]:

$$\gamma_n = \frac{Z_C}{Z_{OL} + Z_C} \quad [10]$$

Knowing resistive-loop gain (gain|$R_L$) from block 112, resistive-loop distribution factor ($\gamma_0$) from block 114, and impedance-load distribution factor ($\gamma_n$) from block 118, one can apply expression [25] to calculate impedance-load gain (gain|$Z_C$) for the matrix of impedance loads $Z_C$, as indicated by a block 120.

$$\text{gain}|Z_C = \text{gain}\left|R_L \cdot \frac{\gamma_n}{\gamma_0}\right. \quad [25]$$

By employing the method of the present invention, one can obtain vectoral information relating to impedance-load gain as it relates to phase and to frequency. The information thus obtained may be used to create a two-dimension reference tool, as indicated by a block 122. Such a reference tool may be in the form of a graphic plot allowing a user to enter information relating to two axes, such as Capacitance C and equivalent series resistance ESR for a particular customer load, and determine gain and phase for that particular customer load. Clearly one skilled in the aft of such testing and evaluation could obtain appropriate information to apply Nyquist's criteria (or other criteria) to predict whether the particular converter apparatus under consideration will be stable for the particular impedance load contemplated Of course, other reference tools may as well be constructed from the information gleaned from the practice of the method of the present invention. Such reference tools may, for example, be presented in the form of a multidimensional vectoral table—either displayed and stored in printed form, or in an on-line form. Other reference tools may also be developed which are within the scope of the present invention, being based upon the method described relating to obtaining the information underlying the reference tool developed.

Practicing the method of the present invention may also be carried out in a situation where certain parameters relating to the converter a s being evaluated are known, or may be independently ascertained. For example, all of the parameters that are indicated in FIG. 5 as inputs to block 114 can be derived using analytical or simulation techniques. It also possible to combine measurements of some parameters and calculations or simulations or other parameters. The mathematical methods described in this description can the be employed to create a reference tool. One embodiment of creation of a reference tool is shown in blocks 116, 118, 120 and 122 in FIG. 5.

The accuracy of the two-dimension reference tool created by the method of the present invention (block 122) can be verified using a process indicated in FIG. 5 as also beginning with block 110—connecting a network analyzer, such as a Bode Network Analyzer (BNA) to the converter apparatus being evaluated.

Continuing a verification method, a complex impedance-load $Z_C$ is selected, as indicated by a block 124. This selection of a complex impedance load indicated by block 124 is contemplated in the exemplary embodiment of the method of the present invention illustrated in FIG. 5 to be a selection of a single value of sample complex impedance load. That is, this verification process illustrated in FIG. 5 is contemplated as a method for verifying validity of a single point (i.e., an (x,y) coordinate) contained within the two-dimension reference tool constructed according to block 122, as described above. Selected complex impedance-load $Z_C$ may, for example, be characterized as the series combination of capacitance (C) and equivalent series resistance (ESR) series connected in parallel with resistive load impedance $R_L$, The network including C, ESR and $R_L$ represents $Z_C$. Using the selected impedance-load $Z_C$, the impedance load gain (gain|$Z_C$) is measured, as indicated by a block 126. This measurement may be compared with a value in the two-dimension reference tool created pursuant to block 122 at the pertinent coordinate values to verify the accuracy of the reference tool at those selected coordinate values, as indicated by a block 128.

Calculations, measurements and observations made or obtained in practicing the method of the present invention to create a two-dimension reference tool are preferably vectoral in nature. That is, the parameter being ascertains measured, calculated or otherwise addressed in practicing the method of the present invention is addressed in terms of magnitude as it relates to phase and frequency of signals imposed upon the converter circuit being evaluated. The imposition of various signals to obtain such a vectoral array of information is effected by a network analyzer, such as a BNA.

Such parameter determination as is contemplated for practicing the method of the present invention may effected in vectoral fashion, in terms of magnitude, phase and frequency—by such methods as PSPICE software analysis or other tools known to those skilled in the art. Software analysis tools, such as PSPICE, allow a practitioner of the method of the present invention to initiate the method from block 114 (Calculate Resistive-Loop Distribution Factor, $\gamma_0$) with all pertinent parameters already determined to proceed directly to block 116 (Select Impedance-Load Matrix, $Z_C$) without ascertaining various other parameters or carrying out various calculations, as contemplated in practicing the method of the present invention when launching the method from block 110.

Figure 6:
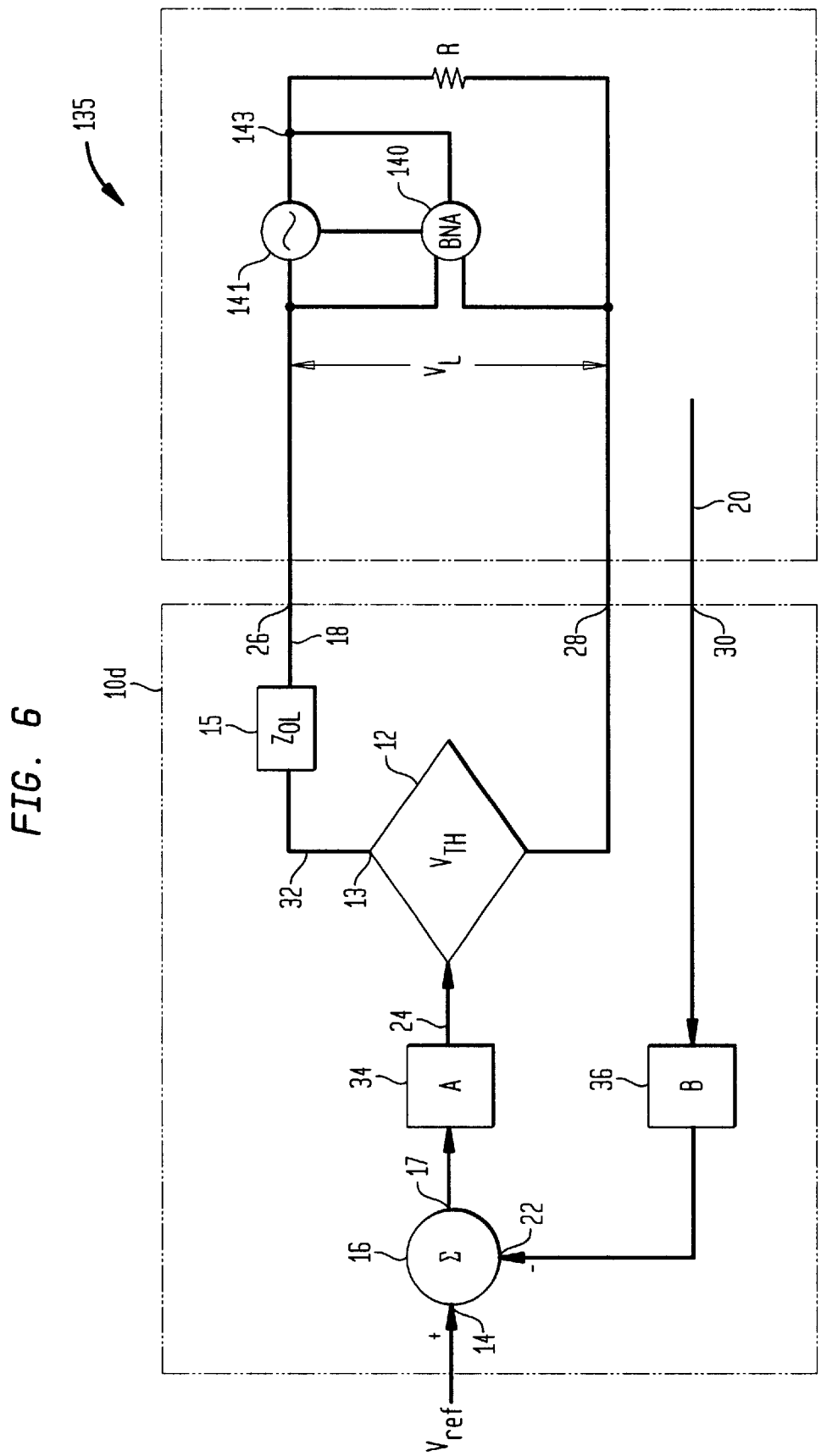
FIG. 6 is an electrical schematic diagram of a power converter apparatus connected with a resistive load and connected with a Bode Network Analyzer for making vectoral measurements of open-loop parameters according to the method of the present invention.

FIG. 6 is an electrical schematic diagram of a power converter apparatus connected with a resistive load and connected with a Bode Network Analyzer for making vectoral measurements of open-loop parameters according to the method of the present invention. In FIG. 6, a converter apparatus 10d is supplying an output circuit 135 connected across output terminals 26, 28. Converter apparatus 10d in FIG. 6 is represented by the same model as converter apparatus 10 in FIG. 1. In order to avoid prolixity, details of the construction of converter pus 10d will not be repeat here.

Output circuit 135 includes a resistive load 137. Resistive load 137 has a value of R. Sense line 20 is not connected. Output circuit 135 to converter apparatus 10d (FIG. 6) illustrates a preferred practical aspect of practicing the method of the present invention in so fir as the method requires measuring open-loop current $I_{OL}$ and open-loop voltage $V_{OL}$ to calculate open-loop impedance $Z_{OL}$. Other measurement techniques may be used to practice the method of the present invention without straying from the intended scope of the invention.

In FIG. 6, output circuit 135 includes a Bode Network Analyzer (hereinafter referred to as a "BNA") 140 connected across output terminals 26, 28 to measure voltage $V_L$ across output circuit 135. BNA 140 also inserts a signal generator 141 in series between output terminal 26 and resistive load 137 to inject signals in output circuit 135. BNA 140 further applies a current sensor 143 to sense current in the line between output terminal 26 to resistive load 137.

A Bode Network Analyzer, such as BNA 140 in FIG. 6, applies a test signal (preferably a sinusoidal signal) using signal generator 141 to a circuit being tested (e.g., output circuit 135) and sweeps the frequency of that test signal across a range of frequencies in discrete steps. A BNA is typically configured for measuring responsive signals to the test signal introduced into the circuit under test. Thus, BNA 140 in output circuit 135 is connected to measure voltage $V_L$ across output circuit 135, and is connected, using current sensor 143, to sense current through open-loop output impedance 15 (i.e., $I_{OL}$). Bode Analyzer BNA 140 senses magnitude and phase of parameters it measures so that BNA 140 determines the phase of a sensed responsive signal (e.g., voltage $V_L$ and open-loop current $I_{OL}$) as it compares with the phase of the test signal (e.g., the signal injected into output circuit 135 by signal generator 141) applied to the circuit being tested (e.g., output circuit 135).

As a practical matter, determination of parameters open-loop current $I_{OL}$ and open-loop voltage $V_{OL}$ may be effected by assuming that Thevenin voltage source 12 is an ideal signal source whose output voltage $V_{TH}$ does not vary. Referring to FIG. 6, because sense line 20 is broken, there is no feedback to Thevenin voltage source 12. Injecting a signal (using signal generator 141) between open-loop output impedance 15 and resistive load 137, measuring current through open-loop output impedance 15 using current sensor 143, and connecting Bode Analyzer BNA to measure voltage across output ports 26, 28 of converter apparatus 10d, sets up converter apparatus 10d (FIG. 6) for vectorally measuring parameters open-loop current $I_{OL}$ and open-loop voltage $V_{OL}$ as signal generator 141 is swept across a range of frequencies of injected signals. The determination of open-loop current $I_{OL}$ and open-loop voltage $V_{OL}$ allow calculation of open-loop impedance $Z_{OL}$:

$$Z_{OL} = \frac{V_{OL}}{I_{OL}} \quad [26]$$

There are simulation and analysis tools available, such as a software program entitled "PSPICE", which enable detailed determination of circuit parameters when construction details of a circuit are known. A determination of such inter parameters as gains A, B, $Z_{OL}$ and $R_L$ may be effected using such a software program or other tools, or such parameters may be known to evaluators because design details are determined beforehand. It is also possible to derive values of ZOL, A and B by successive measurements of the loop gain γ*A*B with the module loaded with different complex loads. Such a situation is described in connection with FIG. 5 above in the case where the method of the present invention is launched from block 114 (FIG. 5).

It is likely most common that one may know the value of open-loop impedance $Z_{OL}$ in choosing a converter a An evaluation of a converter apparatus for which open-loop impedance $Z_{OL}$ is known is described in connection with FIG. 5 above in the case where the method of the present invention is launched from block 110 (FIG. 5).

Figure 7:
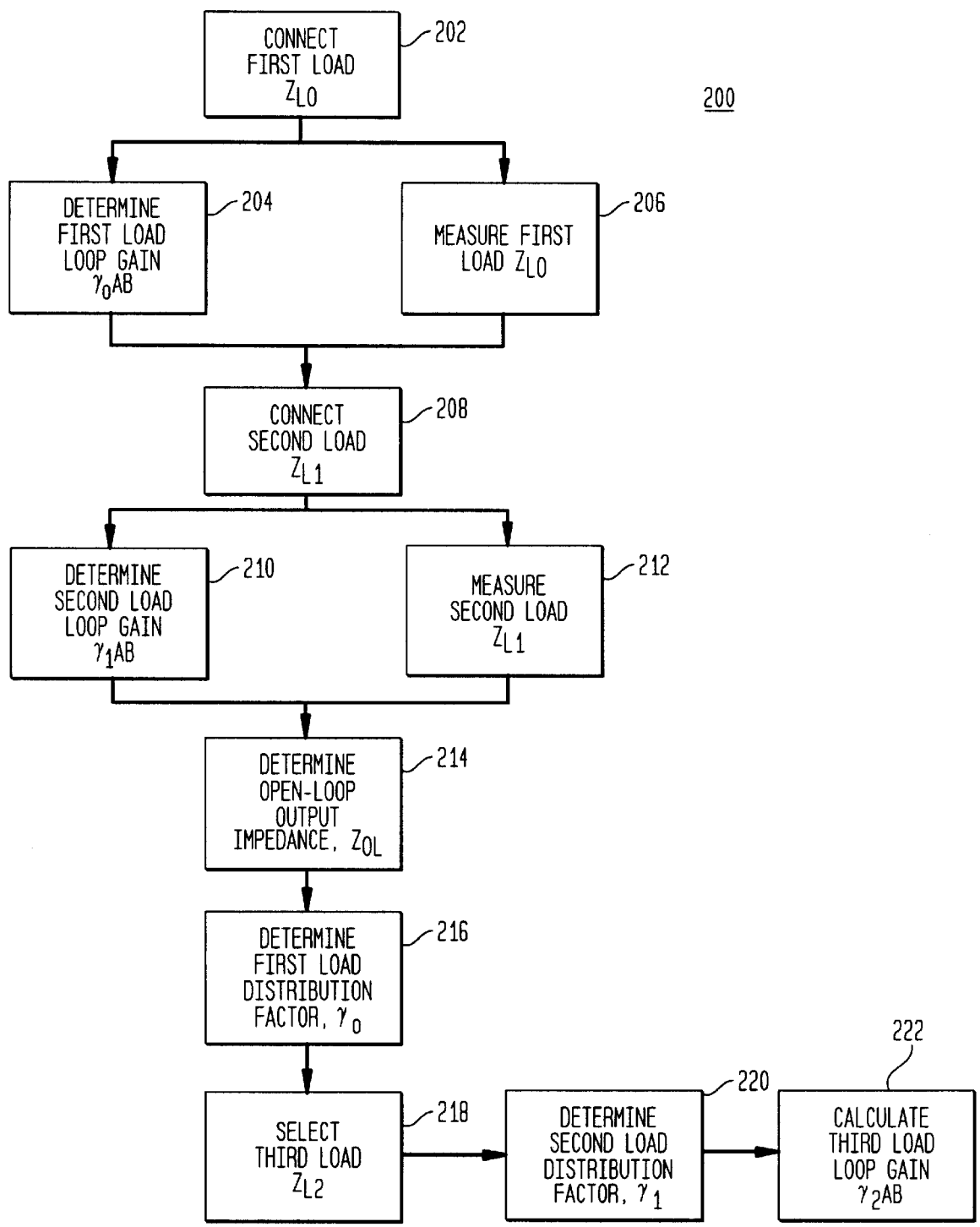
FIG. 7 is a flow chart illustrating an alternate embodiment of the method of the present invention.

FIG. 7 is a flow chart illustrates an alternate embodiment of the method of the present invention. The alternate embodiment of the method provides for deriving open loop impedance $Z_{OL}$ from two measurements of loop gains using two different loads. Using two such measurements provides two independent expressions that can be solved simultaneously to give values for open loop impedance $Z_{OL}$ and for gain product A·B (FIG. 1). In FIG. 7, the alternate embodiment of the method 200 begins with connecting a first load $Z_{L0}$ with outputs of a converter apparatus (e.g., output terminals 26, 28; FIG. 1), as indicated by a block 202. The method continues with, in no particular order, determining a first loop gain $\gamma_0 AB$ of the converter apparatus with first load $Z_{L0}$ attached (as indicated by a block 204), and measuring first load $Z_{L0}$ (as indicated by a block 206). The measurement of first load $Z_{L0}$ is preferably effected in a vectoral manner to record magnitude and phase of first load $Z_{L0}$ for a plurality of signal frequencies.

The method continues with connecting a second load $Z_{L1}$ to the converter apparatus, as indicated by a block 208. Then, in no particular order, a second load loop gain $\gamma_1 AB$ is determined (as indicated by a block 210), and second load $Z_{L1}$ is measured (as indicated by a block 212). The measurement of second load $Z_{L1}$ is preferably effected in a vectoral manner to record magnitude and phase of second load $Z_{L1}$ for a plurality of signal frequencies. Next, open-loop output impedance $Z_{OL}$ for the converter a being evaluated is determined, as indicated by a block 214. Open-loop output impedance $Z_{OL}$ is determined using first load loop gain $\gamma_0 AB$, first load $Z_{L0}$, second load loop gain $\gamma_1 AB$ and second load $Z_{L1}$. This determination is based in simultaneous solutions of the following equations:

$$\gamma_0 AB = \frac{Z_{L0}}{Z_{OL} + Z_{L0}} \cdot AB \quad [27]$$

$$\gamma_1 AB = \frac{Z_{L1}}{Z_{OL} + Z_{L1}} \cdot AB \quad [28]$$

The determination of open loop output impedance $Z_{OL}$ is preferably effected in a vectoral manner to record magnitude and phase of output impedance $Z_{OL}$ for a plurality of signal frequencies.

The method continues by determining first load distribution factor $\gamma_0$, as indicated by a block 216. First load distribution factor $\gamma_0$ is determined using calculated open-loop output impedance $Z_{OL}$ and first load $Z_{L0}$. This is possible because first load loop gain $\gamma_0 AB$ is known (determined according to block 204), and simultaneous solution of expressions [27] and [28] will determine gain product A·B. The determination of first load distribution factor $\gamma_0$ is preferably effected in a vectoral manner to record magnitude and phase of first load distribution factor $\gamma_0$ for a plurality of signal frequencies.

The gain product A·B and output impedance $Z_{OL}$ can not only be determined by simultaneous solution of two equations (derived from two loads) as indicated above but can also be determined by solving (such as curve fitting) multiple equations (more than two equations derived from more than two loads).

Next, the method provides for selecting a third load $Z_{L2}$, as indicated by a block 218. A second load distribution factor $\gamma_1$ is determined using calculated open-loop output impedance $Z_{OL}$ and third load $Z_{L2}$, as indicated by a block 220. The determination of second load distribution factor $\gamma_1$ is preferably effected in a vectoral manner to record magnitude and phase of second load distribution factor $\gamma_1$ for a plurality of signal frequencies.

The method continues, as indicated by a block 222, in calculating a third load loop gain $\gamma_2 AB$ using first load distribution factor $\gamma_0$, second load distribution factor $\gamma_1$ and first load loop gain $\gamma_0 AB$. The determination of third load loop gain $\gamma_2 AB$ is preferably effected in a vectoral manner to record magnitude and phase of third load loop gain $\gamma_2 AB$ for a plurality of signal frequencies.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for determining relationships among loop gain, open loop output impedance, and load impedance as a function of frequency for a power converter apparatus to aid in predicting stability of said converter apparatus under various operating conditions; said converter apparatus having an open-loop output impedance and providing an output signal to an output locus; the method comprising the steps of:

(a) vectorally measuring a first loop gain of said converter apparatus as a function of frequency with a first load impedance connected with said output locus, to record phase and gain of said first loop gain for a plurality of frequencies;

(b) vectorally measuring open loop output impedance as a function of frequency of said converter apparatus, to record phase and gain of said open loop output impedance for a plurality of frequencies;

(c) vectorally measuring said first load impedance as a function of frequency of said converter apparatus, to record phase and gain of said first load impedance for a plurality of frequencies;

(d) calculating a first load distribution factor using said first load impedance and said open-loop output impedance; said calculating being effected in vectoral manner to record magnitude and phase of said first load distribution factor for a plurality of frequencies;

(e) selecting a second impedance load with an output voltage sense point, said second impedance load being representable by a network of at least one resistor and at least one capacitor or inductor, said output voltage sense point being situated at a selected node of said network;

(f) calculating a second load distribution factor for said second impedance load; using said open-loop output impedance and said second impedance load; said calculating being effected in vectoral manner to record magnitude and phase of said impedance-loop load distribution factor for a plurality of frequency values; and (g) calculating a second loop gain using said first loop g, said first load distribution factor and said second load distribution factor; said calculating being effected in vectoral manner to record magnitude and phase of said impedance-load gain for a plurality of frequency values.

2. A method for determining relationships among loop gain, open loop output impedance, and load impedance as a function of frequency for a power converter apparatus to aid in predicting stability of said converter apparatus under various operating conditions as recited in claim 1 wherein the method comprises the further step of:

(h) creating a reference tool relating said second load gain and phase information for selected values of said impedance load for selected frequencies.

3. A method for deetermining relationships among loop gain, open loop output impedance, and load impedance as a function of frequency for a power converter apparatus to aid in predicting stability of said converter apparatus under various operating conditions as recited in claim 2 wherein said reference tool is creed in a multidimensional graphic form.

4. A method for determining relationships among loop gain, open loop output impedance, and load impedance as a function of frequency for a power converter appends to aid in predicting stability of said converter a s under various operating conditions as recited in claim 2 wherein said reference tool is created as a multidimensional vectoral table.

5. A method for determining relationships among loop gain, open loop output impedance, and load impedance as a function of frequency for a power converter apparatus to aid in predicting stability of said converter a under various operating conditions as recited in claim 4 wherein said multidimensional vectoral table is maintained on-line.

6. A method for determining vectoral values for gain, phase and frequency of output signals from a power converter ads; said converter a having an open-loop output impedance and at least one inherent internal gain; said converter apparatus providing an output signal to an output locus; the method comprising the steps of:

(a) in no particular order:
(1) determining resistive-loop gain of said converter apparatus with a known resistive load attached with said output locus; calculating a resistive-loop load distribution factor using said known resistive load and said open-loop impedance; said calculating being effected in vectoral manner to record magnitude and phase of said resistive-loop load distribution factor for a plurality of signal frequencies;

(b) selecting an impedance-load with said output locus;

(c) calculating an impedance-loop load distribution factor for said impedance-load using said open-loop impedance and said impedance-load; said calculating being effected in vectoral manner to record magnitude and phase of said impedance-loop load distribution factor for a plurality of signal frequencies; and (d) calculating an impedance-load gain using said resistive-loop gain, said resistive-loop load distribution factor and said impedance-loop load distribution factor; said calculating being effected in vectoral manner to record magnitude and phase of said revised load distribution factor for a plurality of signal frequencies.

7. A method for determining vectoral values for gain, phase and frequency of output signals from a power converter apparatus as recited in claim 6 wherein the method comprises the further step of:

(e) creating a reference tool relating said impedance-load gain and phase information for selected values of said impedance load for selected frequencies.

8. A method for determining values for gain, phase and frequency of output signals from a power converter apparatus as recited in claim 7 wherein said reference tool is created in a multidimensional graphic form.

9. A method for determining vectoral values for gain, phase and frequency of output signals from a power converter apparatus as recited in claim 7 wherein said reference tool is created as a multidimensional vectoral table.

10. A method for determining vectoral values for gain, phase and frequency of output signals from a power converter apparatus as recited in claim 9 wherein said multidimensional vectoral table is maintained on-line.

11. A method for determining selected parameters for a power converter apparatus to aid in predicting stability of said converted apparatus under a variety of load conditions; said converter apparatus delivering an output signal to an output terminal; the method comprising the steps of:

(a) measuring, in no particular order, in vectoral manner to determine magnitude and phase of a measured parameter for a plurality of frequency values;
(1) a first load loop gain of said converter apparatus with a known first load connected with said output terminal;
(2) open-loop current through an open-loop impedance
(3) open-loop voltage across said open-loop impedance;

(b) calculating an open-loop impedance using said open-loop current and said open-loop voltage; said calculating being effected in vectoral manner to calculate magnitude and phase of said open-loop impedance for a plurality of frequency values;

(c) calculating a first load distribution factor using said known first load and said open-loop impedance; said calculating being effected in vectoral manner to record magnitude and phase of said first load distribution factor for a plurality of frequency values;

(d) selectng a second load;

(e) calculating a second load distribution factor for said second load; using said open-loop impedance and said second load; said calculating being effected in vectoral manner to record magnitude and phase of said second load distribution factor for a plurality of frequency values; and (f) calculating a second load loop gain using said first load loop gain, said first load distribution factor and said second load distribution factor; said calculating being effected in vectoral manner to record magnitude and phase of said second load loop gain for a plurality of frequency values.

12. A method for determining selected parameters for a power converter apparatus to aid in predicting stability of said converter a under a variety of load conditions as recited in claim 11 wherein the method comprises the further step of:

(g) creating a reference tool relating said second load loop gain and phase information for selected values of said second load for selected frequencies.

13. A method for determining selected parameters for a power converter apparatus to aid in predicting stability of said converter apparatus under a variety of load conditions as recited in claim 12 wherein said reference tool is created in a multidimensional graphic form.

14. A method for determining selected parameters for a power converter apparatus to aid in predicting stability of said converter apparatus under a variety of load conditions as recited in claim 12 wherein said reference tool is created as a multidimensional vectoral table.

15. A method for determining selected parameters for a power converter apparatus to aid in predicting stability of said converter apparatus under a variety of load conditions as recited in claim 13 wherein said multidimensional vectoral table is maintained on-line.

16. A method for deetermining relationships among loop gain, open loop output impedance, and load impedance as a function of frequency for a power converter apparatus to aid in predicting stability of said converter apparatus under various operating conditions; said converter apparatus having an open-loop output impedance and providing an output signal to an output locus; the method comprising the steps of:

(a) vectorally measuring a first loop gain ($\gamma_0 \cdot A \cdot B$) of said converter apparatus as a function of frequency with a first load impedance connected with said output locus, recording phase and gain of said first loop gain for a plurality of frequencies;

(b) vectorally measuring open loop output impedance ($Z_{OL}$) of said converter apparatus as a function of frequency, recording phase and gain of said open loop output impedance for a plurality of frequencies;

(c) vectorally measuring said first load impedance ($R_L$) of said converter apparatus as a function of frequency of said converter apparatus, recording phase and gain of said first load impedance for a plurality of frequencies;

(d) vectorally measuring a closed loop output impedance ($Z_{CL}$) of said converter apparatus as a function of frequency of said converter apparatus, recording phase and gain of said closed loop output impedance for a plurality of frequencies;

(e) analytically deriving the values of A, B or A·B using measured values of said first loop gain, said open loop output impedance, said load impedance and said closed loop output impedance;

(f) embedding the values of A, B and $Z_{OL}$ in a simulation model having a Thevenin voltage source with a reference voltage and an output having an open loop impedance, said reference voltage being adjusted by values of A and B; and (g) simulating a second loop gain by placing a second complex load impedance across said output of said model and executing a loop gain analysis in the frequency domain.

17. A method for determining relationships among loop gain, open loop output impedance, and load impedance as a function of frequency for a power converter apparatus to aid in predicting stability of said converter apparatus under various operating conditions as recited in claim 16 wherein selected of said vectorally measured parameters and said derived values are arrayed in a multidimensional vectoral table, said multidimensional vectoral table being maintained on-line.

18. A method for determining vectoral values for gain, phase and frequency of output signals from a power converter apparatus; said converter apparatus having an open-loop output impedance and at least one inherent internal gain; said converter apparatus providing an output signal to an output locus; the method comprising the steps of:

(a) in no particular order:
(1) connecting a selected first complex impedance-load with said output locus;
(2) determining first complex impedance-loop gain of said converter apparatus with said first complex load attached with said output locus; and
(3) calculating a first complex impedance-loop load distribution factor using said first complex load and said open-loop output impedance; said calculating being effected in vectoral manner to record magnitude and phase of first complex impedance-loop load distribution factor for a plurality of signal frequencies;

(b) in no particular order:
(1) connecting a second complex impedance-load with said output locus;
(2) determining second complex impedance-loop gain of said converter apparatus with said second complex load attached with said output locus; and
(3) calculating a second complex impedance-loop load distribution factor using said second complex load and said open-loop output impedance; said calculating being effected in vectoral manner to record magnitude and phase of said second complex impedance-loop load distribution factor for a plurality of signal frequencies;

(c) determining a calculated open-loop output impedance of said converter apparatus using said first complex impedance-loop gain, said first complex impedance-loop load distribution factor, said second complex impedance-loop gain and the second complex impedance-loop load distribution factor; said calculating being effected in vectoral manner to record magnitude and phase of said open-loop output impedance for a plurality of signal frequencies;

(d) selecting a first arbitrary complex impedance;

(e) calculating a first arbitrary complex impedance-load distribution factor using said calculated open-loop output impedance and said first arbitrary complex impedance; and (f) calculating a second arbitrary complex impedance-load gain using said first arbitrary complex impedance load distribution factor and at least one of:
(1) said first complex impedance-loop gain, said first complex impedance-load distribution factor and said calculated open-loop output impedance; and (2) said second complex-loop gain, said second complex impedance-load distribution factor and said calculated open-loop output impedance; each said calculation being effected in vectoral manner to record magnitude and phase of said second arbitrary complex impedance-load gain for a plurality of signal frequencies.

19. A method for determining vectoral values for gain, phase and frequency of output signals from a power converter apparatus as recited in claim 18 wherein the method comprises the further step of:
   (g) creating a reference tool relating said impedance-load gain and phase information for selected values of said impedance load for selected frequencies.

20. A method for determining vectoral values for gain, phase and frequency of output signals from a power converter apparatus as recited in claim 19 wherein said reference tool is created in a multidimensional graphic form.

21. A method for determining vectoral values for gain, phase and frequency of output signals from a power converter apparatus as recited in claim 19 wherein said reference tool is created as a multidimensional vectoral table.

22. A method for determining vectoral values for gain, phase and frequency of output signals from a power converter apparatus as recited in claim 21 wherein said multidimensional vectoral table is maintained on-line.

23. A method for determining vectoral values for gain, phase and frequency of output signals from a power converter apparatus; said converter apparatus having an open-loop output impedance and at least one inherent internal gain; said converter apparatus providing an output signal to an output locus; the method comprising the steps of:
   (a) connecting a selected first load with said output locus;
   (b) in no particular order:
      (1) determining a first load loop gain of said converter apparatus with said first load attached with said output locus;
      (2) measuring said first load; said measuring being effected in vectoral manner to record magnitude and phase of said first load for a plurality of signal frequencies;
   (c) connecting a second load with said output locus;
   (d) in no particular order:
      (1) determining a second load loop gain of said converter apparatus with said second load attached with said output locus;
      (2) measuring said second load; said measuring being effected in vectoral manner to record magnitude and phase of said second load for a plurality of signal frequencies;
   (e) determining an open-loop output impedance of said converter apparatus using said first load loop gain, said first load, said second load loop gain and said second load; said determining being effected in vectoral manner to record magnitude and phase of said open-loop output impedance for a plurality of signal frequencies;
   (f) determining a first load distribution factor using said calculated open-loop output impedance and said first load; said determining being effected in vectoral manner to record magnitude and phase of said first load distribution factor for a plurality of signal frequencies;
   (g) selecting a third load;
   (h) determining a second load distribution factor using said calculated open-loop output impedance and said third load; said determining being effected in vectoral manner to record magnitude and phase of said second load distribution factor for a plurality of signal frequencies; and
   (i) calculating a third load loop gain using said first load distribution factor, said second load distribution factor and said first load loop gain; said calculating being effected in vectoral manner to record magnitude and phase of said third load loop gain for a plurality of signal frequencies.

* * * * *